United States Patent [19]
Romi

[11] Patent Number: 4,545,757
[45] Date of Patent: Oct. 8, 1985

[54] INJECTION MOLDING MACHINES

[75] Inventor: Romeu Romi, Sta. Barbara d'Oeste, Brazil

[73] Assignee: Industrias Romi S/A, Santa Barbara, Brazil

[21] Appl. No.: 587,938

[22] Filed: Mar. 9, 1984

[30] Foreign Application Priority Data

Mar. 9, 1983 [BR] Brazil ................................ 8301222

[51] Int. Cl.⁴ .............................................. B29F 1/00
[52] U.S. Cl. ................... 425/593; 425/451.6; 425/444; 425/DIG. 221; 249/68
[58] Field of Search ............... 249/67, 68; 425/436 R, 425/444, 451.6, 593, DIG. 220, DIG. 222

[56] References Cited

U.S. PATENT DOCUMENTS

| | | | |
|---|---|---|---|
| 2,244,123 | 6/1941 | Sebek | 425/DIG. 222 |
| 2,334,372 | 11/1943 | Abbott et al. | 425/DIG. 222 |
| 2,371,547 | 3/1945 | Rosenlund et al. | 425/DIG. 222 |
| 2,395,100 | 2/1946 | Caron | 425/444 |
| 2,485,290 | 10/1949 | Jelinek | 425/DIG. 222 |
| 2,496,344 | 2/1950 | Hall | 425/DIG. 222 |
| 2,792,592 | 5/1957 | McGee | 425/DIG. 222 |
| 3,161,918 | 12/1964 | Zearbaugh | 425/444 X |
| 3,359,598 | 12/1967 | Bucy | 425/451.6 X |
| 3,418,684 | 12/1968 | Collins | 249/68 X |
| 3,448,488 | 6/1969 | Kiraly | 249/68 X |
| 3,726,625 | 4/1973 | Rees | 249/68 X |
| 3,854,856 | 12/1974 | Herbot et al. | 425/DIG. 222 |
| 4,022,565 | 5/1977 | Bodini | 425/444 |
| 4,047,871 | 9/1977 | Hehl | 249/68 X |
| 4,088,432 | 5/1978 | Farrell | 425/451.6 |
| 4,389,183 | 6/1983 | Laurent et al. | 425/593 X |

Primary Examiner—J. Howard Flint, Jr.
Attorney, Agent, or Firm—Michael J. Striker

[57] ABSTRACT

An injection molding machine including articulating components including a movable cross arm, a set of actuator components for moving the movable cross arm, a central rod having an end and guiding the movable cross arm, a support plate attached to the end of the central rod, extraction components including exclusive guideways and a part extracting plate resting and slidable on the exclusive guideways, and another set of actuator components supported by the support plate which also supports the extraction components.

9 Claims, 4 Drawing Figures 4,545,757

INJECTION MOLDING MACHINES

BACKGROUND OF THE INVENTION

The present invention refers to improvements on plastic injection molding machines or more precisely to an unheard of mechanical system for mold closing and clamping provided with means for actuating the articulated arms used for transmitting the power required for clamping the mold and to a new mechanism for extracting molded parts.

Mold closing and clamping systems known up to the present are provided with different forms of cross arms and articulated arms and actuating elements operated by different types of servo-controls. These systems differ substantially from the ones covered by this invention, not only in respect to constructive forms of the involved elements, but also as far as the mechanism for applying power to the articulated arms actuator by the servo-control.

SUMMARY OF THE INVENTION

The invention refers to an improvement for injection molding machine, which consists of means for travel and clamping of the mold movable carrying plate through articulated arms that are actuated by a cross arm guided through a single central rod, and actuated by means of two hydraulic actuators located close to the cross arm guiding central rod, and separated by an equal distance from the geometric axis of said central rod, consisting also of a system for moving the extracting plate on its own guideways, independent from the guideways for the stationary plate tie rods.

The objective of the present invention refers to a system for mold closing and clamping, which owing to its construction characteristics simplifies in a great extent the elements used for actuating the articulating mechanisms, and to a mechanism for extracting molded parts, which mechanism is provided with its own guideways for slidable rest of the extracting plate.

The main object of the present invention is to provide a mold closing and clamping system for plastic injection molding machines, where the elements for closing and clamping consist of parts arranged in such a manner that they allow simplicity in their form, and as a consequence make possible substantial production savings and at the same time, they impart operational speed and safety for the mold closing and clamping system even considering the high clamping forces.

Another object of the present invention is to provide own guideways for the extracting plate, making them independent from the guideways for the tie rods that connect the front and rear stationary plates, or the bars that support and guide the cross arm of the articulating system as it can be found on known machines.

It is a further object of the present invention to provide support means for the parts extraction mechanism in such a way that it also serves as a partial support for the mold closing and clamping mechanism, resulting in this way a greater degree of use for the machine structural elements.

More specifically, the present invention consists of improvements on plastic injection molding machines, which use articulating arms for travel and clamping of the mold movable support plate, actuated by a movable cross arm guided on a single central rod, and actuated by two hydraulic actuators close and parallel to the cross arm guiding central rod, mounted at equal distance and opposite to the geometric axis of said rod, said hydraulic actuators consisting each of cylinder piston provided with elongated rod and each rod fixed at the edges of said movable cross arm, being said elongated rods the actuating elements themselves, because these elements are actuated by hydraulic flow under pressure to which said cylinders react internally, which in turn are mounted each one jointed to the stationary rear plate.

Still another object of this invention refers to a mechanism for extracting molded parts, which is provided with extracting plate slidably guided through its own guideways, which said guideways are jointed on one side to the mold movable support plate, and on the other to a stationary plate which is also used as partial support for the single central rod of the mold closing and clamping mechanism.

The objectives, features and advantages of the present invention will be understood from the following description of preferred embodiments when read in connection with the accompanying drawings.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
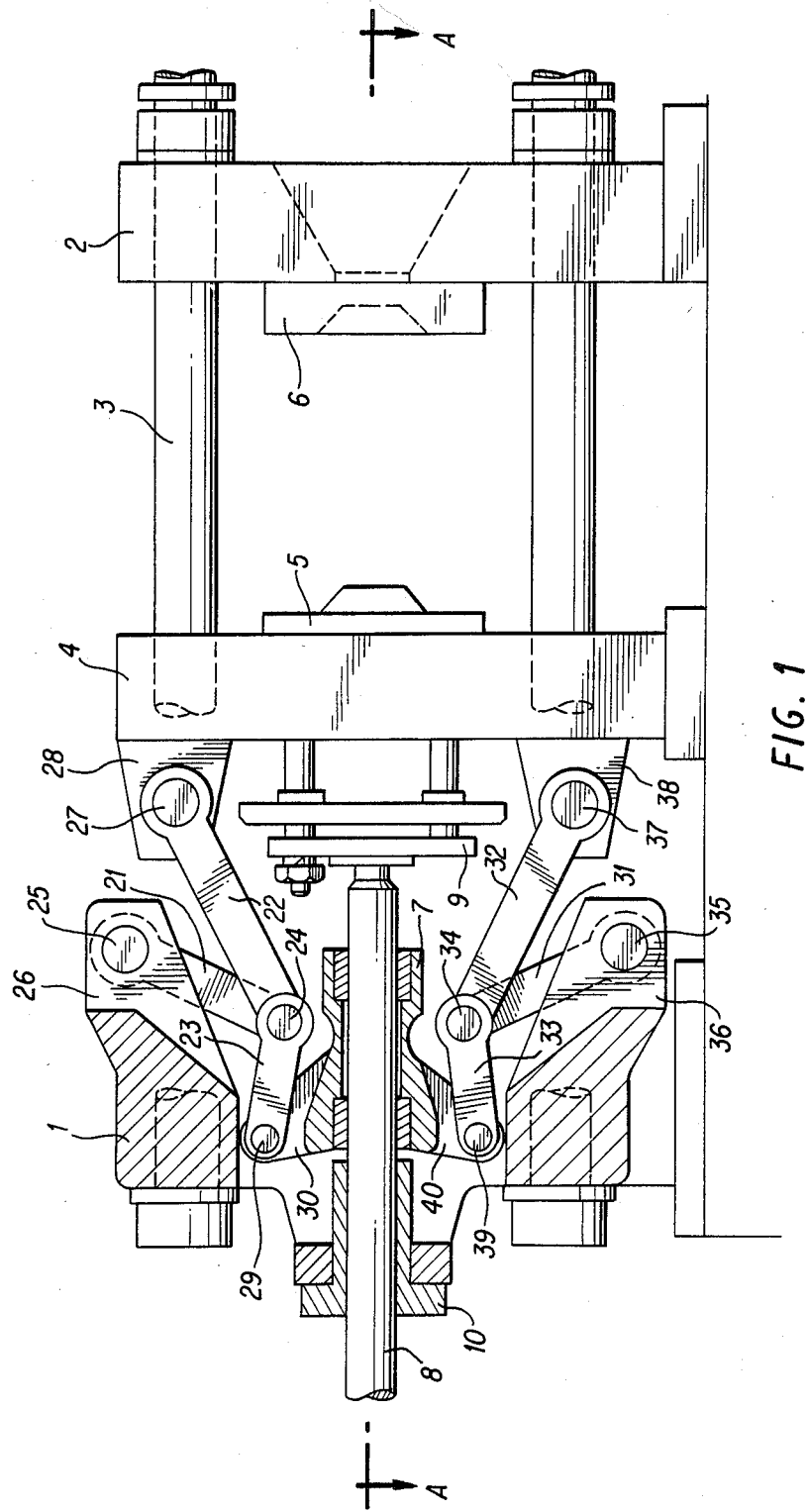
FIG. 1 is the longitudinal section on a vertical plane passing through the geometrical axis of the central rod of an injection molding machine incorporating the present invention and showing the mold movable plate in its opened position.

The injection molding machine consists of rear stationary plate 1, front stationary plate 2 distant from each other and connected by four tie bars 3, movable plate 4 interposed between stationary plates 1 and 2, being said movable plate 4 guided and slidable on the four tie bars 3 for alternative movement in respect to the stationary plates; mold for shaping products consisting of two halves 5 and 6, being one of the halves 6 fixed on the internal side of stationary plate 2, and the other half 5, fixed on the mold movable support plate 4, being that the two halves 5 and 6 of said mold, are aligned between themselves along the machine geometrical axis, which axis is parallel to said four tie bars 3, cross arm 7 that is guided and slidable with alternative movements on single central rod 8, which holds at one of its end support plate 9 of the extraction mechanism, being the other end freely supported on bushing 10, located on rear stationary plate 1.

The alternative movement of cross arm 7 is performed through the action of elongated rods 11 and 12 of two hydraulic actuators 13 and 14, located close to central rod 8 for guiding said cross arm, being that said elongated rods 11 and 12 are fixed on edges 15 and 16 of said cross arm 7, which permits action of balanced forces.

The cylindrical bodies of hydraulic actuators 13 and 14 are rigidly fixed on rear stationary plate 1 through flanged bushings 17 and 18.

Two sets of articulating mechanisms 19 and 20, arranged symmetrically opposite to each other for feed movement, clamping and return of mold movable plate 4, being the upper articulating mechanism 19 comprised of arms 21, 22 and 23, connected and pivoting between themselves by pin 24 at one of its end, and having arm 21 connected and pivoting at the other end by pin 25 at ear 26 of rear stationary plate 1, arm 22 connected and pivoting at the other end by pin 27 at ear 28 of mold movable plate 4, arm 23 connected and pivoting at the other end by pin 29 at ear 30 of cross arm 7.

Extracting plate 41 guided and slidable on its own guideways 42, said guideways fixed at one end directly to the rear face of mold movable plate 4, and connected at the other end by plate 9 on which are fixed the bodies of hydraulic actuators 43 and 44, whose rods 45 and 46 connected to extracting plate 41 impart alternative movement to said extracting plate.

FIG. 1 shows mold movable plate 4 in its open position, that is, in the position nearest to rear stationary plate 1, in this position the systems for articulating mechanisms 19 and 20 are contracted, and mold halves 5 and 6 are retracted, and mold halves 5 and 6 are separated and far one from the other. When hydraulic actuators 13 and 14 are actuated by oil under pressure at chambers 47 and 48, rods 11 and 12 of said hydraulic actuators push cross arm 7, which through the two articulating mechanism systems 19 and 20, displaces mold movable plate 4 towards front stationary plate 2, being that from the geometric position of articulating mechanisms 19 and 20, during the travel with constant speed of cross arm 7, results a displacement of the mold movable plate at variable speed, which at the beginning of travel displaces at high speed for rapid approach and slows down while the articulating mechanism systems stretch out, until at the end of travel when mold halves 5 and 6 should lean one against the other, the displacement is at low speed thus avoiding shock between the two metal mold halves, and at the same time closing with high pressure, pressing tightly both parts of the mold and remaining clamped during injection operation and curing of the injected material.

Figure 2:
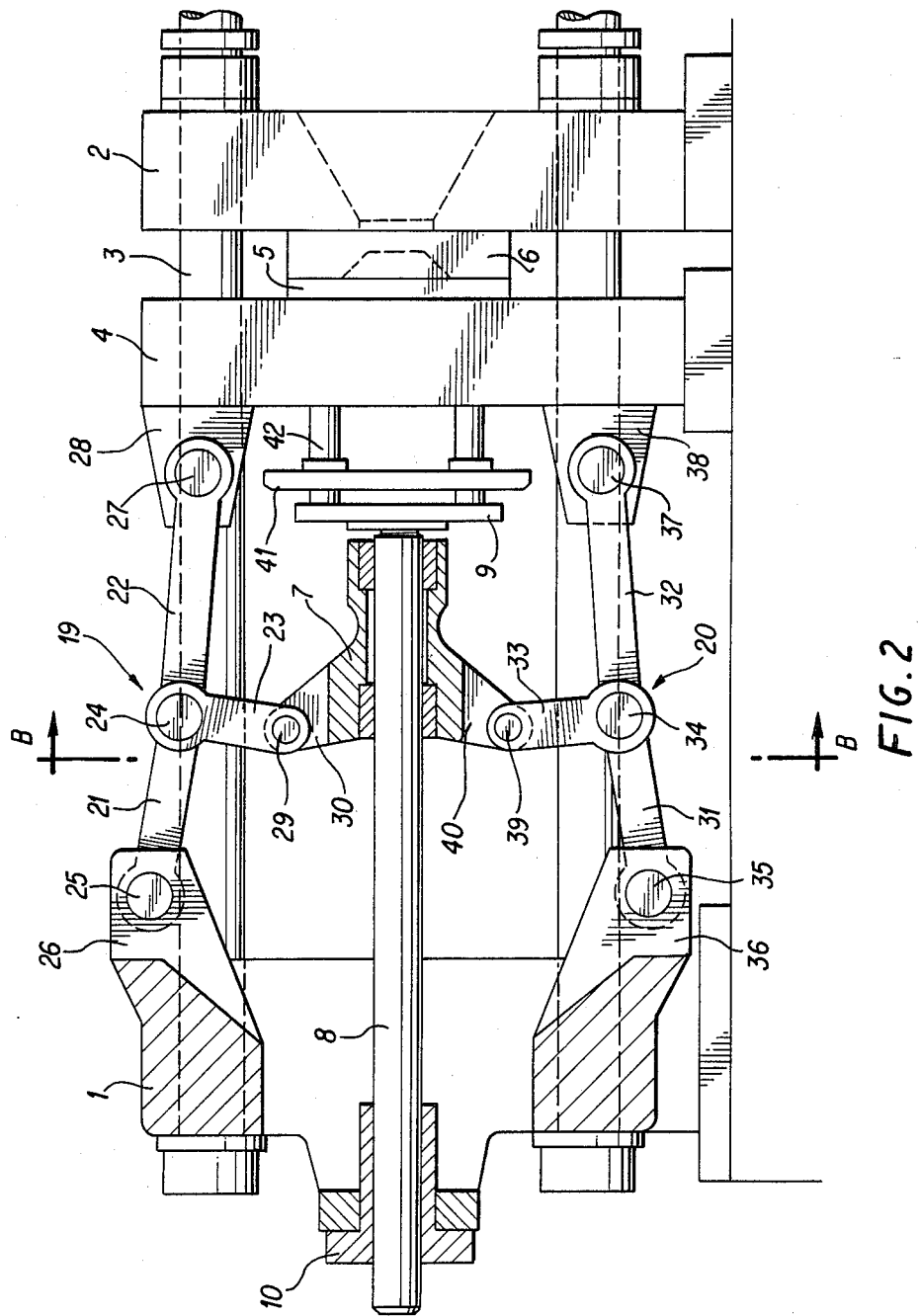
FIG. 2 is a section passing through the same plane of FIG. 1, however, showing the mold movable support plate in its closed and clamped position.
Figure 3:
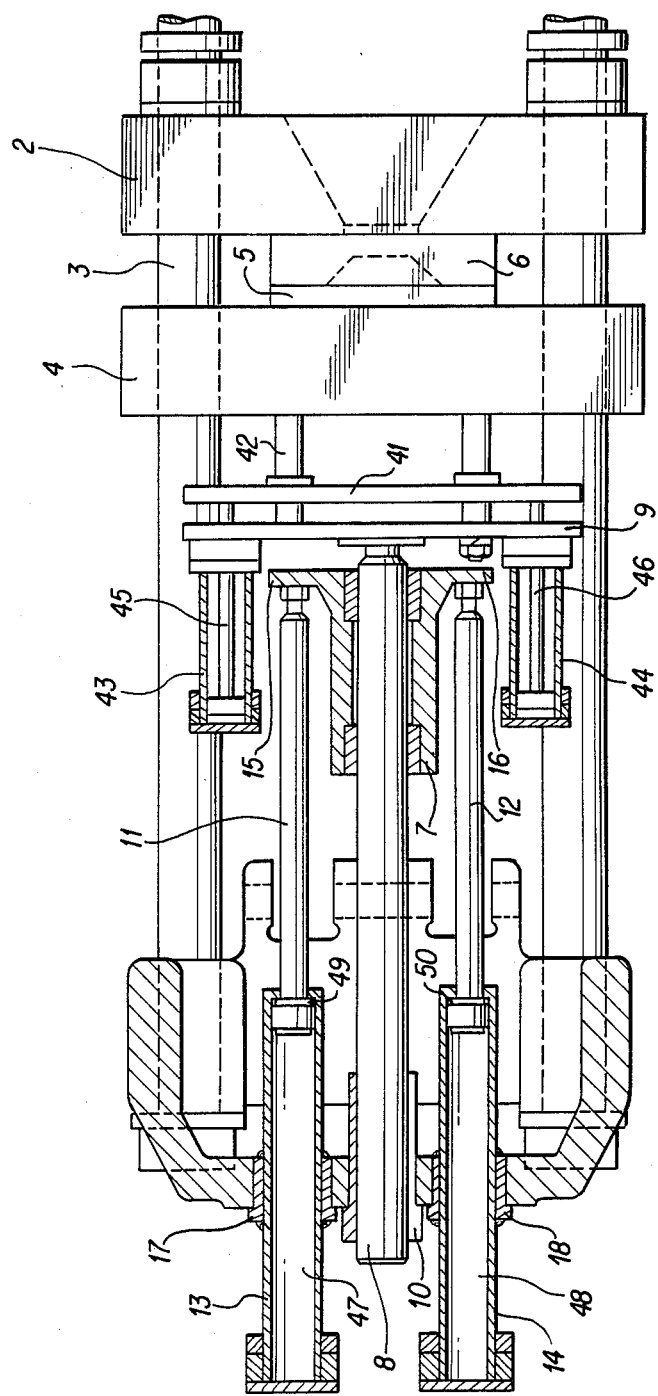
FIG. 3 is a longitudinal section on a horizontal plane passing along section line A—A of FIG. 1.
Figure 4:
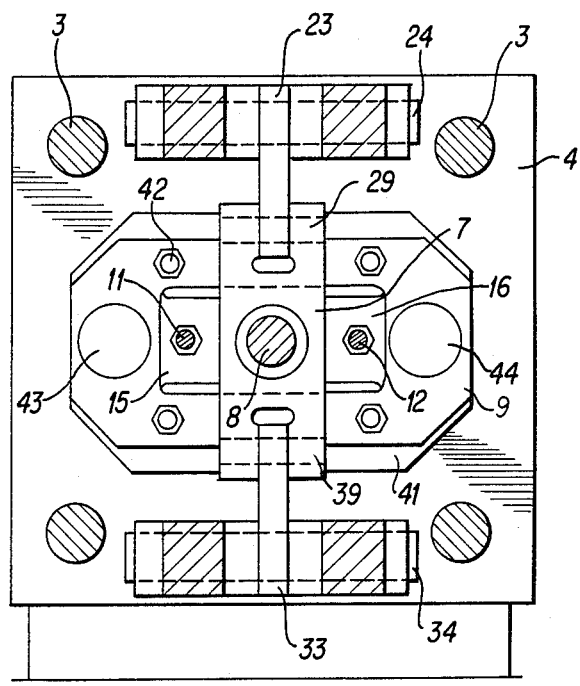
FIG. 4 is a cross section on a plane passing on section line B—B of FIG. 2.

Clamping action is performed by the irreversible position of the two articulating mechanism systems 19 and 20 when in stretched out position as shown in FIG. 2.

After injection and curing operations are performed, the two hydraulic actuators 13 and 14 are actuated on reverse, that is, oil under pressure is introduced in chambers 49 and 50 of said hydraulic actuators causing rods 11 and 12 to push back cross arm 7, which through the two articulating mechanism systems displace mold movable plate away from front stationary plate 2, and to approach rear stationary plate 1 thus performing mold opening.

At the same time mold movable plate 4 is returning to open the molds, hydraulic actuators 43 and 44 are actuated, which through rods 45 and 46 push extracting plate 41 which actuates on extracting pins not shown in the figures, which are used for extracting the injected part from the mold.

It will be understood that each of the elements described above, or two or more together, may also find a useful application in other types of constructions differing from the types described above.

While the invention has been illustrated and described as embodied in an injection molding machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An injection molding machine, comprising:
   articulating means including a movable cross arm;
   first actuator means for moving said movable cross arm;
   a central rod having an end and guiding said movable cross arm;
   a support plate attached to said end of said central rod;
   extraction means including exclusive guideways and a part extracting plate resting and slidable on said exclusive guideways; and
   second actuator means supported by said support plate which also supports said extraction means.

2. The machine as defined in claim 1, wherein said first and second actuator means include hydraulic actuators.

3. The machine as defined in claim 2, wherein said first actuator means includes two hydraulic actuators.

4. The machine as defined in claim 3, wherein said two hydraulic actuators of said first actuator means are disposed close and parallel to said central rod and said central rod has a geometric axis from which said two hydraulic actuators of said first actuator means are equally spaced.

5. The machine as defined in claim 3, wherein each of said two hydraulic actuators of said first actuator means includes a hydraulic cylinder and a piston having an elongated rod with a fixing terminal.

6. The machine as defined in claim 1, wherein said central rod has a geometric axis and said movable cross arm has two lateral edges disposed one at each side with respect to a vertical plane passing through said geometric axis of said central rod.

7. The machine as defined in claim 6; further comprising hydraulic cylinders each of which are connected to said rear stationary plate, and pistons each of which has an elongated rod with a fixing terminal, said movable cross arm of said first actuator means having each lateral edges attached to said fixing terminal of said elongated rod.

8. The machine as defined in claim 7; further comprising a bushing disposed in a rear stationary plate and said central rod having another end being freely supported in said bushing of said rear stationary plate.

9. The machine as defined in claim 1; further comprising a movable mold plate, said extractor means including a support plate and hydraulic actuators, said exclusive guideways displacing said part extracting plate and having a first and a second side, and said exclusive guideways attaching on said first side to said movable mold plate and on said second side to said support plate supporting said hydraulic actuators of said extractor means and said central rod.

* * * * *